United States Patent
Hsiao et al.

(10) Patent No.: US 8,243,993 B2
(45) Date of Patent: Aug. 14, 2012

(54) METHOD FOR MOVING OBJECT DETECTION AND HAND GESTURE CONTROL METHOD BASED ON THE METHOD FOR MOVING OBJECT DETECTION

(75) Inventors: Pei-Chi Hsiao, Taoyuan County (TW); Pang-Wei Hsu, Taipei (TW)

(73) Assignee: MSI Computer (ShenZhen) Co., Ltd., Shenzhen (CN)

( * ) Notice: Subject to any disclaimer, the term of this patent is extended or adjusted under 35 U.S.C. 154(b) by 392 days.

(21) Appl. No.: 12/730,355

(22) Filed: Mar. 24, 2010

(65) Prior Publication Data
US 2011/0135148 A1    Jun. 9, 2011

(30) Foreign Application Priority Data
Dec. 8, 2009  (TW) ................................ 98141890 A

(51) Int. Cl.
*G06K 9/00*  (2006.01)
*H04N 5/225* (2006.01)

(52) U.S. Cl. ....................................... 382/103; 348/169

(58) Field of Classification Search .................. 382/103, 382/107, 164, 171, 173, 236; 348/94, 154, 348/155, 169, 170, 171, 172, 208.1, 208.2, 348/208.14, 208.16; 342/28, 90
See application file for complete search history.

(56) References Cited

U.S. PATENT DOCUMENTS

| | | | |
|---|---|---|---|
| 5,594,469 A * | 1/1997 | Freeman et al. | 345/158 |
| 6,215,890 B1 * | 4/2001 | Matsuo et al. | 382/103 |
| 7,502,528 B2 * | 3/2009 | Mishima et al. | 382/294 |

FOREIGN PATENT DOCUMENTS

| | | |
|---|---|---|
| TW | 393629 | 6/2000 |
| TW | I224288 | 11/2004 |
| TW | I274296 | 2/2007 |
| TW | I298461 | 7/2008 |

* cited by examiner

*Primary Examiner* — Abolfazl Tabatabai
(74) *Attorney, Agent, or Firm* — Rabin & Berdo, P.C.

(57) ABSTRACT

A method for moving object detection includes the steps: obtaining successive images of the moving object and dividing the successive images into blocks; selecting one block, calculating color feature values of the block at a current time point and a following time point; according to the color feature values, obtaining an active part of the selected block; comparing the color feature value of the selected block at the current time point with that of the other blocks at the following time point to obtain a similarity relating to each of the other blocks, and defining a maximum similarity as a local correlation part; obtaining a motion-energy patch of the block according to the active part and the local correlation part; repeating the steps to obtain all motion-energy patches to form a motion-energy map; and acquiring the moving object at the current time point in the motion-energy map.

14 Claims, 12 Drawing Sheets

| $X^{t-1}(n-11)$ | $X^{t-1}(n-8)$ | $X^{t-1}(n-6)$ | $X^{t-1}(n-9)$ | $X^{t-1}(n-12)$ |
|---|---|---|---|---|
| $X^{t-1}(n-7)$ | $X^{t-1}(n-3)$ | $X^{t-1}(n-2)$ | $X^{t-1}(n-4)$ | $X^{t-1}(n-10)$ |
| $X^{t-1}(n-5)$ | $X^{t-1}(n-1)$ | $X^{t-1}(n)$ | $X^{t-1}(n+1)$ | $X^{t-1}(n+5)$ |
| $X^{t-1}(n+10)$ | $X^{t-1}(n+4)$ | $X^{t-1}(n+2)$ | $X^{t-1}(n+3)$ | $X^{t-1}(n+7)$ |
| $X^{t-1}(n+12)$ | $X^{t-1}(n+9)$ | $X^{t-1}(n+6)$ | $X^{t-1}(n+8)$ | $X^{t-1}(n+11)$ |

FIG. 3

| $X^t(n-11)$ | $X^t(n-8)$ | $X^t(n-6)$ | $X^t(n-9)$ | $X^t(n-12)$ |
|---|---|---|---|---|
| $X^t(n-7)$ | $X^t(n-3)$ | $X^t(n-2)$ | $X^t(n-4)$ | $X^t(n-10)$ |
| $X^t(n-5)$ | $X^t(n-1)$ | $X^t(n)$ | $X^t(n+1)$ | $X^t(n+5)$ |
| $X^t(n+10)$ | $X^t(n+4)$ | $X^t(n+2)$ | $X^t(n+3)$ | $X^t(n+7)$ |
| $X^t(n+12)$ | $X^t(n+9)$ | $X^t(n+6)$ | $X^t(n+8)$ | $X^t(n+11)$ |

FIG. 4

| 2 | 2 | 2 | 2 | 2 | 2 | 2 |
|---|---|---|---|---|---|---|
| 2 | 1 | 2 | 1 | 2 | 1 | 2 |
| 2 | 2 | 2 | 2 | 2 | 2 | 2 |
| 2 | 1 | 2 | 1 | 2 | 1 | 2 |
| 2 | 2 | 2 | 2 | 2 | 2 | 2 |
| 2 | 1 | 2 | 1 | 2 | 1 | 2 |
| 2 | 2 | 2 | 2 | 2 | 2 | 2 |

FIG. 10

METHOD FOR MOVING OBJECT DETECTION AND HAND GESTURE CONTROL METHOD BASED ON THE METHOD FOR MOVING OBJECT DETECTION

CROSS-REFERENCES TO RELATED APPLICATIONS

This non-provisional application claims priority under 35 U.S.C. §119(a) on Patent Application No. 98141890 filed in Taiwan, R.O.C. on 2009 Dec. 8, the entire contents of which are hereby incorporated by reference.

BACKGROUND OF THE INVENTION

1. Technical Field

The present invention relates to the recognition of a track of a moving object, and more particularly to a method for moving object detection and a hand gesture control method based on the moving object detection.

2. Related Art

One developing trend among computer devices has been to input instructions by hand gestures instead of directly contacting a computer device. In a conventional gesture input system, a user has to wear special gloves or finger cots, which are used for sensing a change of a posture or position of palms, so as to generate a corresponding input instruction. In view of the inconvenience caused by using the gloves or finger cots, the gesture image recognition technology has been introduced into a hand gesture control system, in which a video camera is used to capture hand gesture images and analyzes a change of a posture or position thereof, so as to generate a corresponding input instruction.

The current hand gesture recognition technology recognizes a change of a posture or position of a palm by using preprocessed hand contour images. For example, as disclosed in Taiwan Patent No. 393629 and I224288, different algorithm mechanisms are used to convert images and a palm is found out from each image by specific features as hand gestures. Taiwan Patent No. I298461 has illustrated discovering a static hand gesture image from images and then comparing the static hand gesture image with a specific gesture image in a database. The successful recognition in the above methods all depends on the factor whether a gesture contour can be accurately cut or line features of the gesture contour can be precisely extracted from the images. However, the process of cutting the gesture contour and extracting the line features is usually influenced by factors such as background, light source, and shadow. Meanwhile, the distance between a hand and a video camera and the posture change of the hand or the palm itself further influence the process of cutting the gesture contour. In order to improve the recognition rate, a database with a large number of preset gestures has to be created for making comparison, or an error tolerance is increased. In one aspect, when the database with a large number of preset gestures is used for making comparison in the recognition, the recognition speed is influenced and more hardware resources has to be consumed. In another aspect, the increase of the error tolerance further increases a probability of incorrect recognition results.

In the above patents as the prior art, the recognition is performed on a static hand image, so that the process of cutting a gesture contour, extracting line features, and making comparison with a database needs to be performed. In contrast, Taiwan Patent No. I274296 and U.S. Pat. No. 5,594,469 have disclosed to search for a dynamic object in successive images to recognize a dynamic gesture image. However, in Taiwan Patent No. I274296 and U.S. Pat. No. 5,594,469, an object other than the palm is easily regarded as a dynamic hand gesture, causing misjudgment under the influence of ambient light, movement of a human in the environment, face skin color, camera lens shaking, or image noise. Therefore, although the dynamic hand gesture recognition does not require cutting a gesture contour precisely, the problem of misinterpreting a moving object, noise, or the like as a dynamic hand gesture, still needs to be solved.

SUMMARY

In view of the static hand gesture recognition method in the prior art, a database with a large number of preset gestures has to be created. In view of the dynamic hand gesture recognition method in the prior art, a moving object, noises, or the like is misinterpreted as a dynamic hand gesture. The present invention is directed to a method for moving object detection, which achieves a high precision and requires fewer hardware resources.

The present invention provides a method for moving object detection, applicable to recognize a moving object in a scene and mark a position of the moving object, which includes: obtaining successive images of the moving object and dividing the successive images into a plurality of blocks; selecting one of the blocks and calculating color feature values of the selected block at a current time point and a following time point; obtaining a active part of the selected block according to the color feature values at the current time point and the following time point; comparing the color feature value of the block at the current time point with color feature values of the other blocks at the following time point one by one to respectively obtain a corresponding similarity, and defining a maximum similarity as a local correlation part; obtaining a motion-energy patch of the selected block according to its active part and local correlation part; repeating the above steps to obtain motion-energy patches of all the blocks, so as to form a motion-energy map; and acquiring a position of the moving object at the current time point according to the motion-energy map.

The present invention integrates an active part produced by a moving object in a scene with a local correlation part produced due to a position change of the moving object, so as to establish a motion-energy map. The motion-energy map is used for acquiring the moving object in successive images. In the procedure for obtaining the motion-energy map, the factors such as noises and change of light and shadow that may cause misjudgment are eliminated, thereby preventing an object having a similar color as that of a hand from being misinterpreted as the hand gesture. In comparison with the prior art, the present invention does not need background modeling to remove the background in the successive images, and simplifies the step of detecting the moving object into two independent procedures, thereby rapidly marking a spatial position of the moving object with fewer hardware resources.

BRIEF DESCRIPTION OF THE DRAWINGS

FIGS. 3 and 4 are schematic views of dividing successive images into a plurality of blocks at a current time point and a following time point;

FIGS. 10 and 11 are schematic views of first blocks, second blocks, and third blocks in a phased search procedure according to the present invention.

DETAILED DESCRIPTION

Referring to FIGS. 1 to 4, a method for moving object detection provided in an embodiment of the present invention is shown, which is applicable to detect a moving object 10 in a scene and marking a position of the moving object 10, so as to generate an input instruction by using a position change of the moving object 10 in a time axis. The moving object 10 may be a palm of a user of a data processing device. The data processing device 20 (for example, a computer or a notebook computer), is installed with a program for executing an instruction input method.

Figure 1:
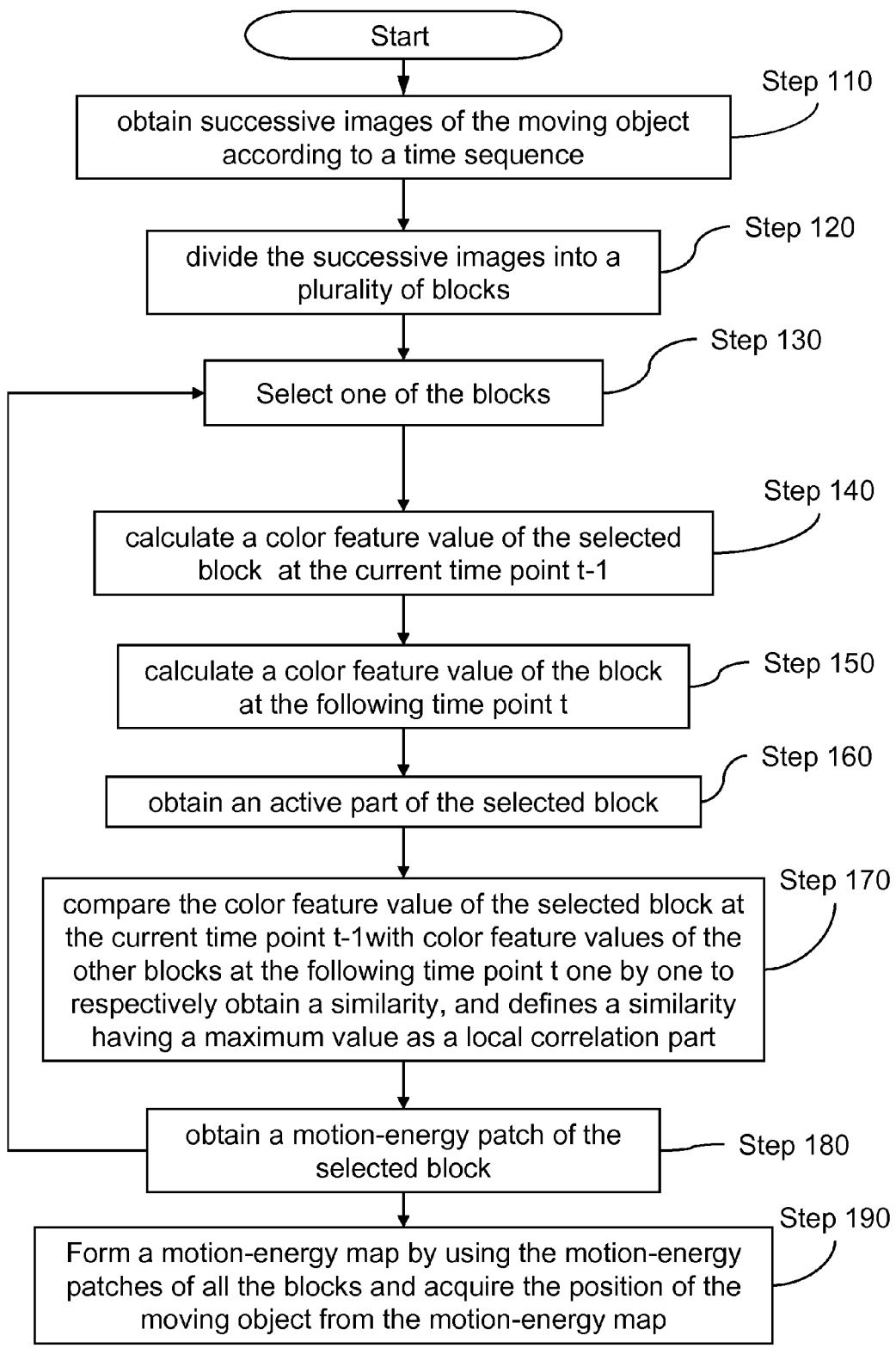
FIG. 1 is a flow chart of a method for moving object detection according to the present invention.
Figure 2:
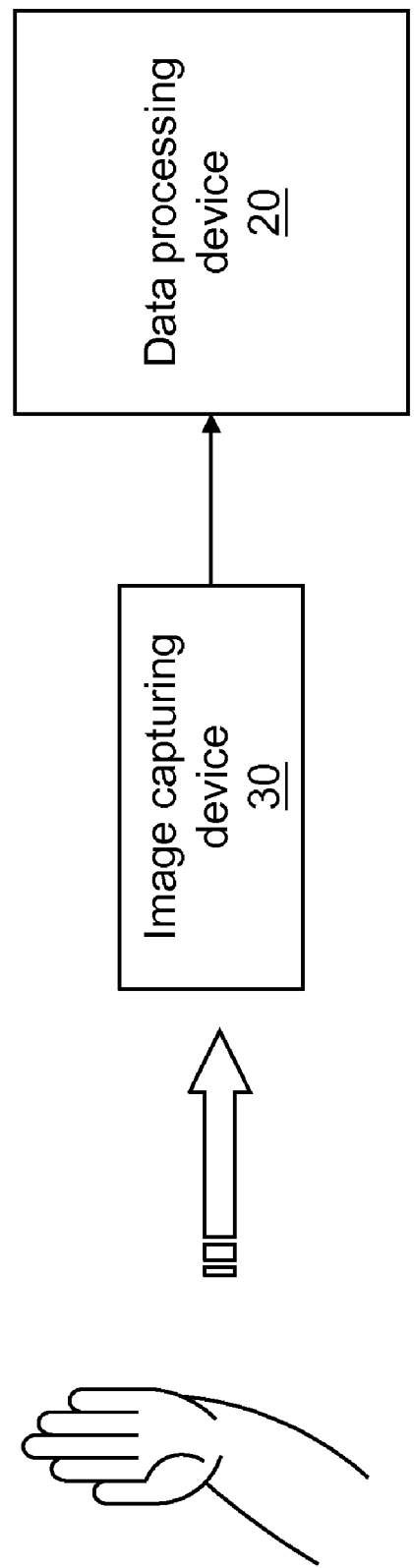
FIG. 2 is a block diagram of a system for performing the method for moving object detection according to the present invention.

Referring to FIGS. 1 and 2, in the method for moving object detection of the present invention, successive images of the moving object 10 is obtained through an image capturing device 30. The image capturing device 30 may be a video camera externally connected to or built in the data processing device 20. The image capturing device 30 obtains successive images of the moving object 10 according to a time sequence (Step 110), and transfers the successive images to the data processing device 20.

The image capturing device 30 respectively captures a frame at a current time point t−1 and a following time point t. The current time point t−1 and the following time point t may be time points when the image capturing device 30 continuously generates two frames. Alternatively, an interval of a plurality of frames exist between the frame obtained at the current time point t−1 and the frame obtained at the following time point t, i.e., after one frame is obtained at the current time point t−1, a next frame is obtained after an interval of several frames, and a time point when the next frame is generated is defined as the following time point t.

Referring to FIGS. 1, 3, and 4, in which the data processing device 20 divides the successive images into a plurality of blocks X(n) (Step 120). As shown in FIGS. 3 and 4, the successive images is divided into 5×5 (totally 25) blocks (X(n) to X(n±i), i=0, ±1 to ±12). This is merely an example of the present invention's division of the successive images into 5×5 (totally 25) blocks, but is not intended to limit the number of blocks into which the successive images are divided.

Figure 5:
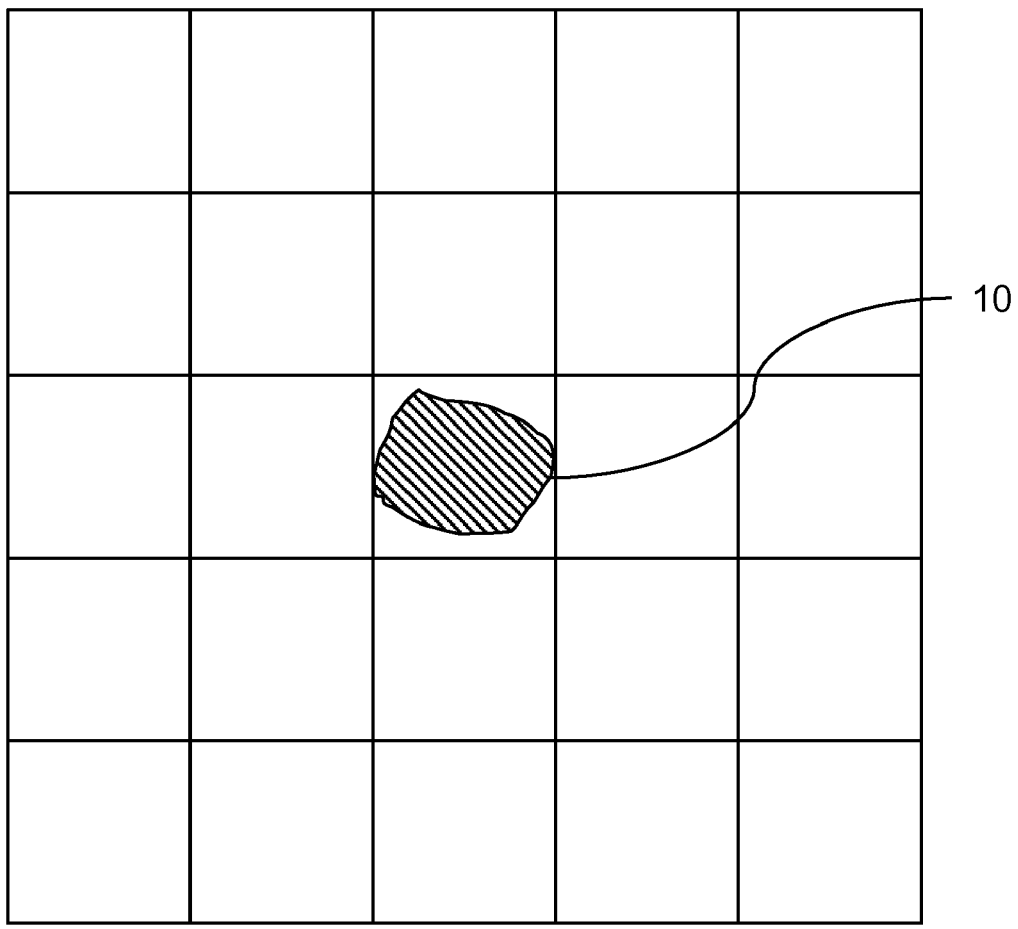
FIG. 5 is a position of a moving object in the successive images at the current time point.

Referring to FIGS. 3 and 5, in which the data processing device 20 selects one of the blocks as a selected block $X^{t-1}(n)$ (Step 130), and calculates a color feature value $Vec^{t-1}(n)$ of the selected block $X^{t-1}(n)$ at the current time point t−1 (Step 140).

In FIGS. 3 and 5, the moving object 10 is, for example, located at the block X(n) for demonstration, so as to illustrate how to acquire a position of the moving object 10 at the current time t−1 through the method for moving object detection of the present invention. In fact, the data processing device 20 has to perform the same processing procedure on each block, so as to acquire the moving object 10.

Figure 6:
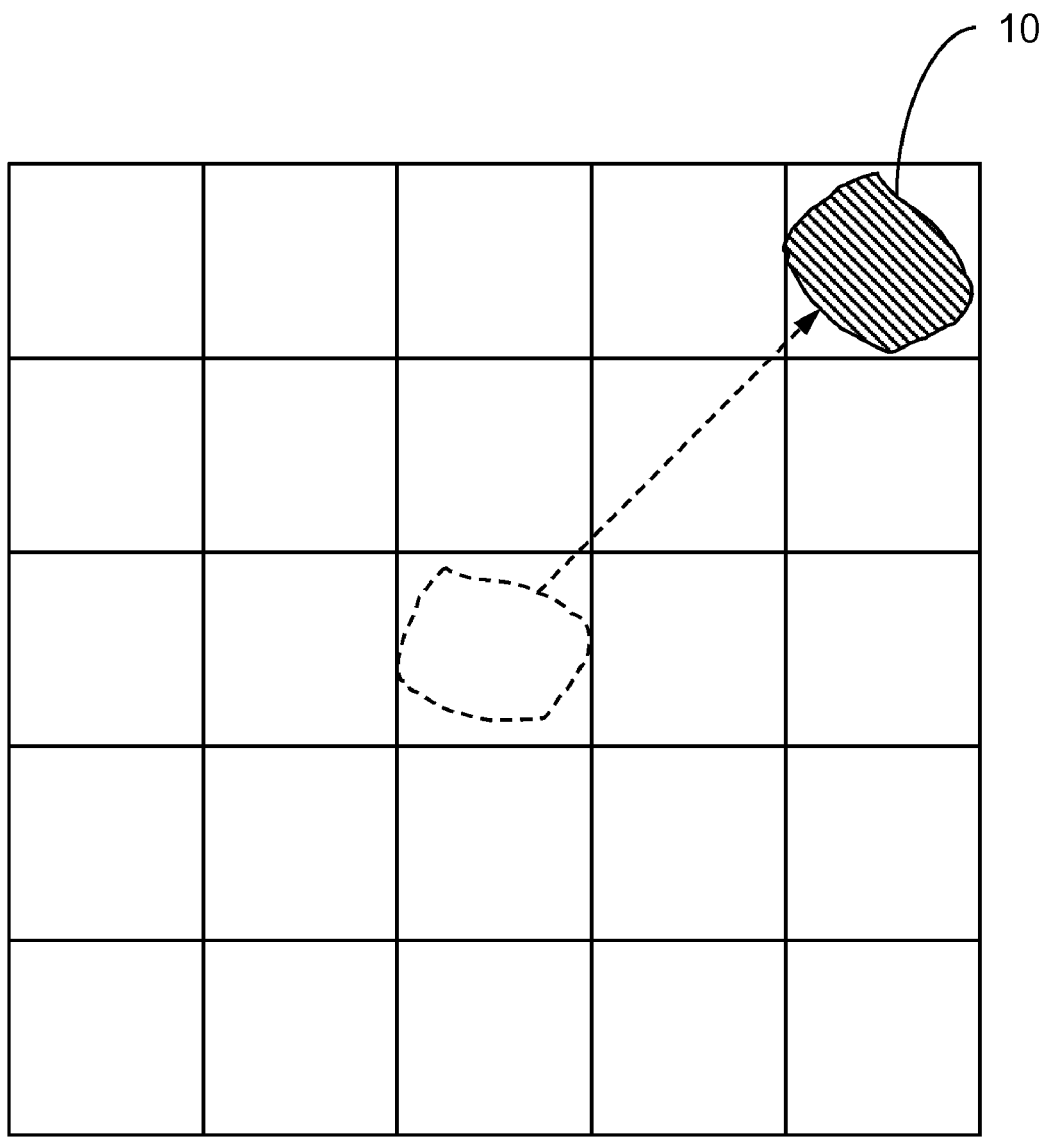
FIG. 6 is a position of the moving object in the successive images at the following time point.

Referring to FIGS. 4 and 6, in which the data processing device 20 calculates a color feature value $Vec^t(n)$ of the block $X^t(n)$ at the following time point t (Step 150). For the illustration, the block at the current time point t−1 is marked by taking (t−1) as the superscript, and the block at the following time point t is marked by taking (t) as the superscript.

In the successive images, the moving object 10 not only moves linearly in two-dimensional directions, but also actually moves approaching or away from the image capturing device 30, thereby resulting in a change of the size of the moving object 10 in the successive images. Furthermore, the moving object 10 may also rotate, so that its shape in the successive images is also changed. Specifically, the moving object 10 captured in the present invention is mainly a palm, the shape of which is always changing.

In order to acquire the moving object 10 from the successive images and determine its position change before and after the movement, the shape change of the moving object 10 in the successive images and the color change in the entire successive images under the influence of light have to be considered. Thus, in the present invention, the color feature value Vec(n) is employed to describe the feature of each block, so as to acquire possible positions of the moving object 10 at the current time point t−1 and the following time point t by using the change of the color feature value Vec(n).

The color feature value Vec(n) may be a color moment, a color histogram, or the like, of each block. The calculation of the color moment is relatively simple, which thus is a preferred embodiment of the color feature value Vec(n).

Since the color feature values Vec(n) are obtained, the data processing device 20 obtains an active part Active(n) of the selected block Xt−1(n) according to the color feature value Vect−1(n) at the current time point t−1 and the color feature value $Vec^t(n)$ at the following time point t in the block $X^{t-1}(n)$ (Step 160).

The active part Active(n) is a difference between color feature values ($Vec^{t-1}(n)$, $Vec^t(n)$) of the same block ($X^{t-1}(n)$, $X^t(n)$) at different time points, i.e., a changing rate from the color feature value $Vec^{t-1}(n)$ at the current time point t−1 to the color feature value $Vec^t(n)$ at the following time point t. As an optimal description format, the active part Active(n) equals to a result obtained by dividing an absolute value of a difference between the color feature value $Vec^{t-1}(n)$ at the current time point t−1 and the color feature value $Vec^t(n)$ at the following time point t by the color feature value $Vec^{t-1}(n)$ at the current time point t−1, which is shown as follows:

$$\text{Active}(n) = \frac{\|Vec^{t-1}(n) - Vec^t(n)\|}{Vec^{t-1}(n)}$$

The greater the active part Active(n) is, the more likely the moving object 10 will exist in the block X(n). Accordingly, the color feature value Vec(n) has a large change in the time coursing from the current time point t−1 to the following time point t. If the active part Active(n) is extremely small, the color feature value Vec(n) may be not changed or have a small change, which indicates that an image contained in this corresponding block X(n) is a stationary background.

It is assumed that the moving object 10 is located in $X^{t-1}(n)$ at the current time point t−1, and at the following time point t, the moving object 10 moves from the $X^{t-1}(n)$ in the frame at the current time point t−1 to the position of $X^t(n-12)$ in the frame at the following time point t. The image capturing device 30 performs sampling at a very small time interval, and generally obtains one frame at an interval of about 1/30 seconds. As determined according to the characteristics of the image capturing device 30, the moving object 10 may move to an adjacent block at the following time point t. the data processing device 20 compares the color feature value $Vec^{t-1}(n)$ of the moving object 10 at the current time point t−1 with color feature values $Vec^t(n+i)$ of the other blocks $X^t(n+i)$ at the following time point t to obtain similarity relations, and then a possible position of the moving object 10 at the following time point t is determined by using the similarity, so as to filter flicker noises in the image.

Although the calculation is merely performed on the block $X(n)$ in the aforementioned illustration, the active part Active(n) of each block ($X(n) \sim X(n \pm i)$) has to be obtained actually.

After the data processing device 20 calculates the active part Active(n) for each block ($X(n)$ to $X(n \pm i)$), two blocks $X^{t-1}(n)$ and $X^{t-1}(n-12)$ having maximum active part (Active(n) and Active(n−12)) are obtained, and it can be known that the moving object 10 is respectively located in the two blocks $X(n)$ and $X(n-12)$ at the current time point t−1 and the following time point t. However, it still cannot determine whether the moving object 10 moves from $X(n)$ to $X(n-12)$ or in an opposite direction. Thus, a local correlation part Corr(n) of each block ($X(n)$ to $X(n \pm i)$) further needs to be estimated.

Therefore, the data processing device 20 compares the color feature value $Vec^{t-1}(n)$ of the selected block $X^{t-1}(n)$ at the current time point t−1 with color feature values ($Vec^t(n \pm i)$, i=±1 to ±12) of the other blocks ($X^t(n \pm i)$, i=±1 to ±12) at the following time point t one by one to respectively obtain a similarity, and defines a similarity having a maximum value as a local correlation part Corr(n) (Step 170). The mathematical form of the local correlation part is shown as follow:

$$Corr(n) = \max_{i \in \{\pm 1, \ldots, \pm 12\}} \{Sim(Vec^{t-1}(n), Vec^t(n+i))\}$$

The data processing device 20 obtains a motion-energy patch E(n) of the block $X^{t-1}(n)$ according to the active part Active(n) and the local correlation part Corr(n) of the block $X^{t-1}(n)$ (Step 180). The mathematical form of the motion-energy patch may be represented as follows:

Motion-energy patch: $E(n)=Active(n) \times Corr(n)$

In this way, it can be determined which one of the two blocks $X(n)$ and $X(n-12)$ is the block where the moving object 10 is located at the current time point t−1 through the motion-energy patch E(n).

As described above, the active part Active(n), local correlation part Corr(n), and motion-energy patch E(n) have to be calculated for each block ($X(n)$ to $X(n \pm i)$, i=0, ±1 to ±12). Thus, the data processing device 20 repeats Steps 130 to 180 to obtain motion-energy patches E(n) of all the blocks ($X(n)$ to $X(n \pm i)$, i=0, ±1 to ±12), so as to form a motion-energy map, thereby discovering the moving object 10 from the motion-energy map.

Figure 7:
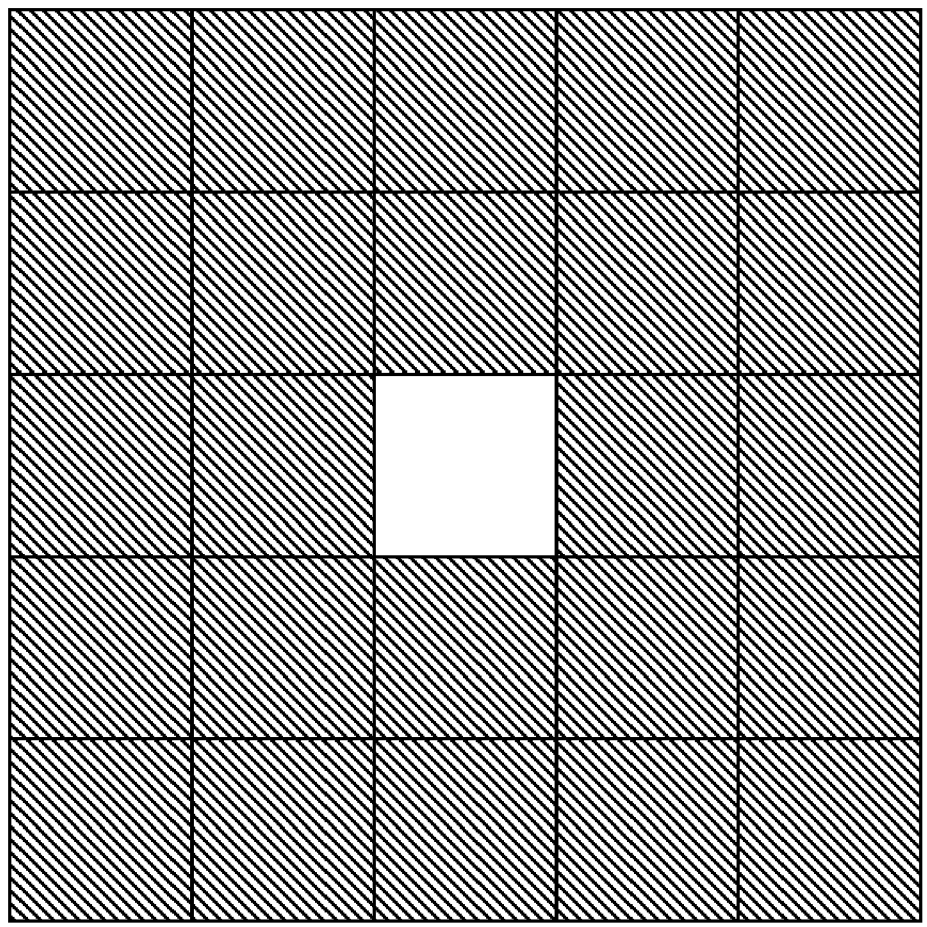
FIG. 7 is a motion-energy patches distribution diagram of a motion-energy map at the current time point.

Referring to FIG. 7, in which the data processing device 20 fills the motion-energy patches E(n) at the current time point t−1 into a set of matrixes corresponding to the blocks, and the motion-energy patches E(n) of all the blocks form a motion-energy map. In FIG. 7, the part with a light color in the motion-energy map represents high motion-energy patches E(n), and the part with a dark color in the motion-energy map represents low motion-energy patches E(n), so that the motion-energy map at the current time point t−1 is shown in FIG. 7. The data processing device 20 sets a threshold and defines one or a plurality of blocks having motion-energy patches E(n) exceeding the threshold as the moving object 10 (Step 190). In this way, the data processing device 20 can acquire the moving object 10 and obtain the position of the moving object 10 from the motion-energy map at the current time point t−1.

Referring to FIGS. 3, 4, and 7, in which through the motion-energy map obtained at the current time point t−1, a higher motion-energy patch E(n) may be obtained in the block corresponding to $X(n)$, which indicates that the moving object 10 is located in the block $X(n)$ at the current time point t−1 and moves towards other positions.

Positions of the moving object 10 at different time points can be obtained by setting each time point as a current time point t−1 and implementing the above method step by step, and then a motion track thereof is generated accordingly, so as to input an instruction through the motion track.

Figure 8:
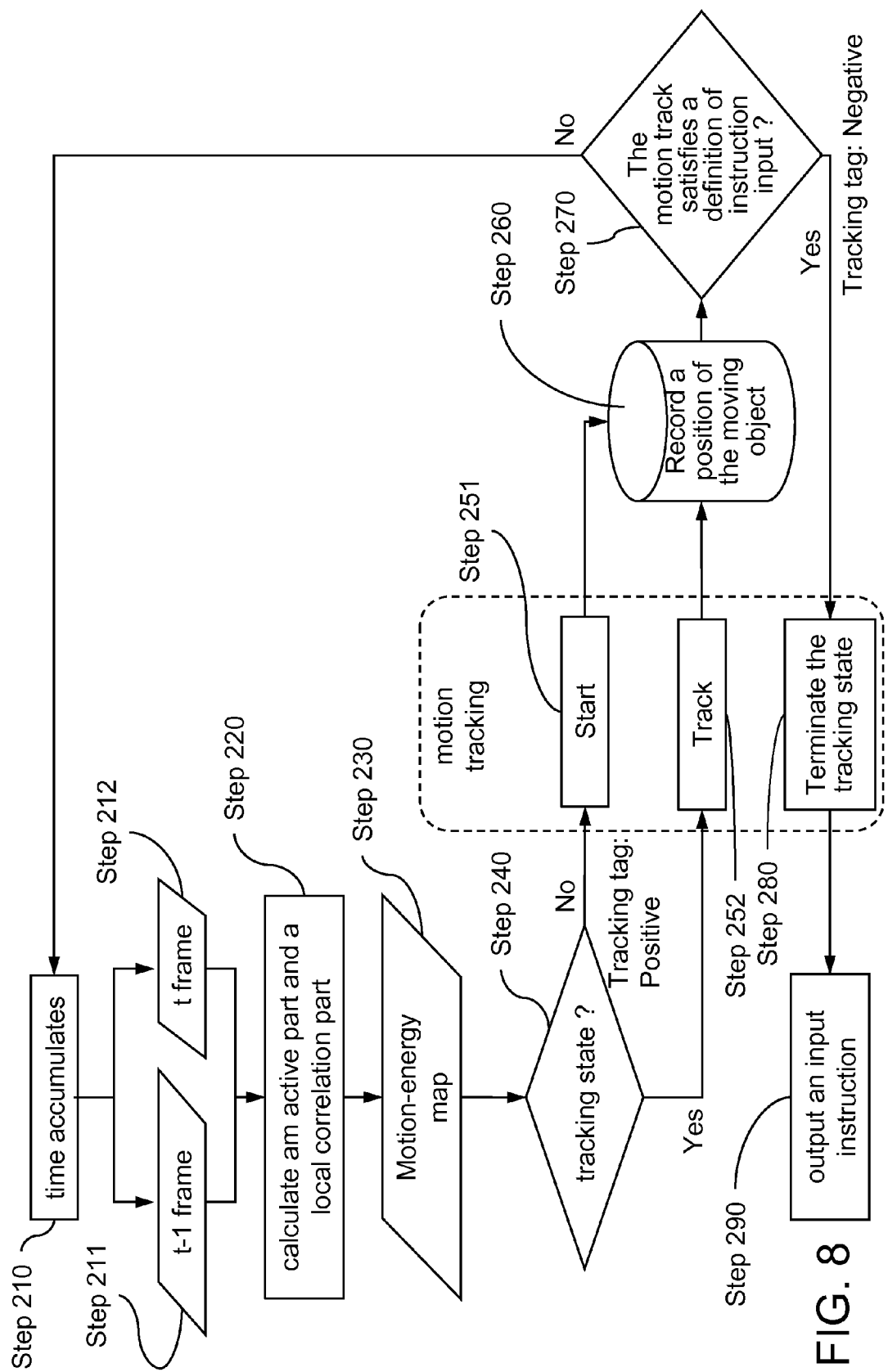
FIG. 8 is a flow chart of a hand gesture control system based on moving object detection.

Referring to FIG. 8, based on the aforementioned method for moving object detection, the present invention further provides a hand gesture control method, which is applicable to generating a motion track by recognizing a position change of the moving object 10, so as to execute an input instruction corresponding to the motion track. The data processing device 20 for executing the instruction input method is pre-stored with motion tracks and input instructions corresponding to the motion tracks.

As time accumulates, the data processing device 20 obtains successive images according to a time axis (Step 210), and separates a frame at a current time point t−1 (Step 211) from a frame at a following time point t (Step 212).

Next, the data processing device 20 calculates a active part Active(n) and a local correlation part Corr(n) of each block according to the aforementioned frames (Step 220).

Subsequently, the data processing device 20 calculates a motion-energy patch E(n) of each block at the current time point t−1 according to the active part Active(n) and the local correlation part Corr(n), so as to form a motion-energy map (Step 230). And then the data processing device 20 defines one or a plurality of blocks as the moving object 10 according to the motion-energy map, so as to acquire a position of the moving object 10.

After the position of the moving object 10 has been acquired, the data processing device 20 further determines a state of a tracking tag, so as to determine whether the data processing device 20 is acquiring the motion track of the objection (Step 240).

If the tracking tag is marked as negative, the data processing device 20 initializes the tracking tag to be marked as positive and clears a register space thereof, so as to start a tracking flow for the motion track (Step 251); if the tracking tag is marked as positive, positions of the moving object 10 are recorded continuously in the register space, so as to generate a motion track through the position change.

After the flow for determining the motion track in Step 251 starts, the data processing device 20 first records a position of the moving object 10 (at the current time point t−1) in the register space (Step 260). According to the motion track generated due to the position change of the moving object 10, the data processing device 20 may determine whether the motion track satisfies a definition of instruction input (Step 270).

Since the data processing device 20 has just initialized the tracking tag to be marked as positive and cleared the register space at this time, the data of only one position is recorded in the register space, so that no track can be generated to satisfy any definition of instruction input. The loop therefore returns to Step 210, in which the data processing device 20 further acquires positions of the moving object 10 at subsequent time points.

On the contrary, if the tracking tag is already positive in Step 240, it means that the positions of the moving object 10 acquired previously have already been recorded in the register space, and at this time, the data processing device 20 directly enters a tracking state (Step 252), directly records the position of the moving object 10 in the register space (Step 260), and compares the position with the other positions that have been stored in the register space, so as to generate a motion track of the moving object 10.

At this time, if the data processing device 20 determines that the motion track of the moving object 10 satisfies the preset definition of instruction input (Step 270), the data processing device 20 marks the tracking tag as negative and terminates the tracking state (Step 280). Meanwhile, the data processing device 20 outputs an input instruction corresponding to the motion track (Step 290). If the data processing device 20 determines that the aforementioned motion track still fails to satisfy the definition of instruction input, the loop returns to Step 210, in which the data processing device further acquires positions of the moving object 10 at subsequent time points and records a motion track of the object 10.

Figure 9:
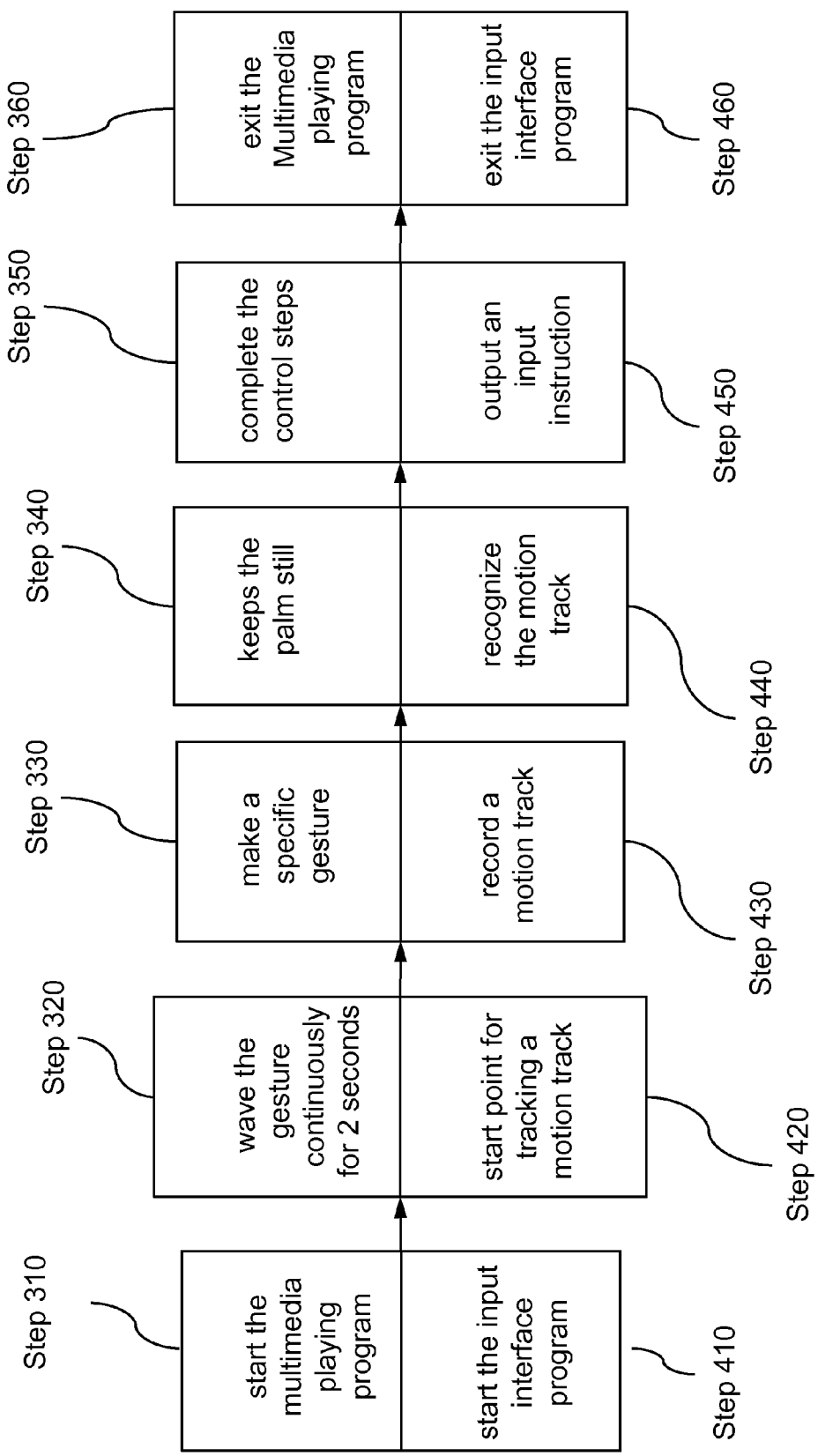
FIG. 9 is a flow chart of using a multimedia playing program employing the hand gesture control system based on moving object detection in an example of the present invention.

Referring to FIG. 9, an example of a multimedia playing program is cited below to further illustrate the instruction input method.

The multimedia playing program is installed in the data processing device 20. Meanwhile, the data processing device 20 is also installed with an input interface program for executing the hand gesture control method based on the method for moving object detection. The input interface program may be integrated into the multimedia playing program.

When the user starts the multimedia playing program in the data processing device 20 (Step 310), the input interface program is started at the same time (Step 410). The input interface program starts the image capturing device 30 to acquire a successive images acquired.

In order to avoid all the moving objects captured by the image capturing device 30 from being identified as the moving object 10, mis-triggering the gesture recognition operating function of the multimedia playing program, a determining loop may be further added to the input interface program, which takes a specific dynamic gesture as a start point for gesture tracking. That is, the input interface program does not start to execute Step 210 shown in FIG. 8 of tracking and recording the moving object 10 captured by the image capturing device 30 and determining whether a motion track thereof satisfies a preset gesture, until an object with the specific dynamic gesture appears.

Referring to FIG. 9, the specific dynamic gesture is set as reciprocal waving of a gesture for a specific time period (for example, 2 seconds), in this example. In other words, when the user intends to enable the gesture operating function, the user waves their palm in front of the image capturing device 30 for more than 2 seconds. The aforementioned small-extent reciprocal waving of the palm (the moving object 10), may produce a distribution of higher motion-energy patches E(n) in a fixed block or blocks within a fixed range in a motion-energy map. When the data processing device 20 determines that a state of waving the gesture continuously for more than 2 seconds occurs in the image captured by the image capturing device 30 (Step 320), the state of waving the gesture continuously for more than 2 seconds is marked as a start point for tracking a motion track of the moving object 10 (Step 420). At this time, the input interface program is switched to Step 210 shown in FIG. 8.

Next, the user makes a specific gesture in front of the image capturing device 30 (Step 330), and the data processing device 20 records sequentially the positions of the moving object 10 (i.e., the palm of the user), analyzes a motion track of the moving object 10 according to a position change, and records the motion track (Step 430).

The user keeps the palm still after completing the gesture (Step 340), such that the input interface program can no longer capture the moving object 10. At this time, the input interface program recognizes whether or not the motion track satisfies a predefined gesture (Step 440).

Next, the data processing device 20 completes the control steps (Step 350), and outputs a corresponding input instruction (Step 450), in which if no predefined gesture is satisfied, a prompt that the recognition fails or the gesture is not defined is generated.

Finally, the program returns to the original loop and waits for the dynamic gesture (Step 320) to occur. After the user exits the multimedia playing program (Step 360), the user also exits the input interface program at the same time (Step 460), so as to prevent the input interface program from continuously capturing the dynamic state of the gesture, which influences the normal operation of the data processing device 20.

In the present invention, successive images are divided into a plurality of blocks to track positions of the moving object 10. However, the moving object 10 may occupy parts of a plurality of adjacent blocks at the same time, so that an error occurs in determining the local correlation. As a result, a large difference exists between an actual position of the moving object 10 and a position determined by the system, which influences the energy estimation of a motion-energy map. However, if the successive images are cut into smaller blocks, more comparisons needs to be made, which results in an increased amount of computation, so that the hardware with a higher computing performance is required to analyze the successive images.

In order to solve the above problem, the present invention further provides a phased search procedure, which is applicable to calculate a local correlation of a block, so as to expand the searching range without increasing the amount of computation.

Referring to FIG. 10, in which before searching for a local correlation part Corr(n), the data processing device 20 first groups the blocks into a plurality of first blocks 1 and a plurality of second blocks 2. The first blocks 1 and the second blocks 2 are arranged in a two-dimensional matrix, and each of the first blocks 1 and the second blocks 2 is rectangular. Two first blocks 1 in the same dimension have at least one second block 2 arranged there-between, and each first block 1 is surrounded by eight second blocks.

Figure 11:
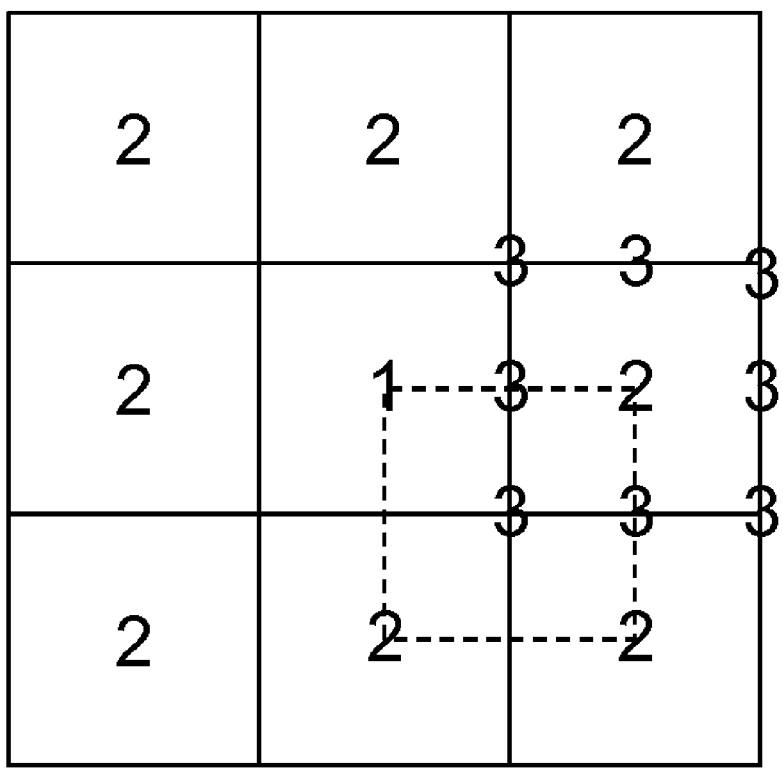

Referring to FIG. 11, in which the data processing device 20 defines a plurality of third blocks 3. Each third block 3 has the same size as that of the first blocks 1 and the second blocks. Moreover, a centroid of each third block 3 is located at a midpoint or endpoint of a side edge of the first block 1 or the second block.

Figure 12:
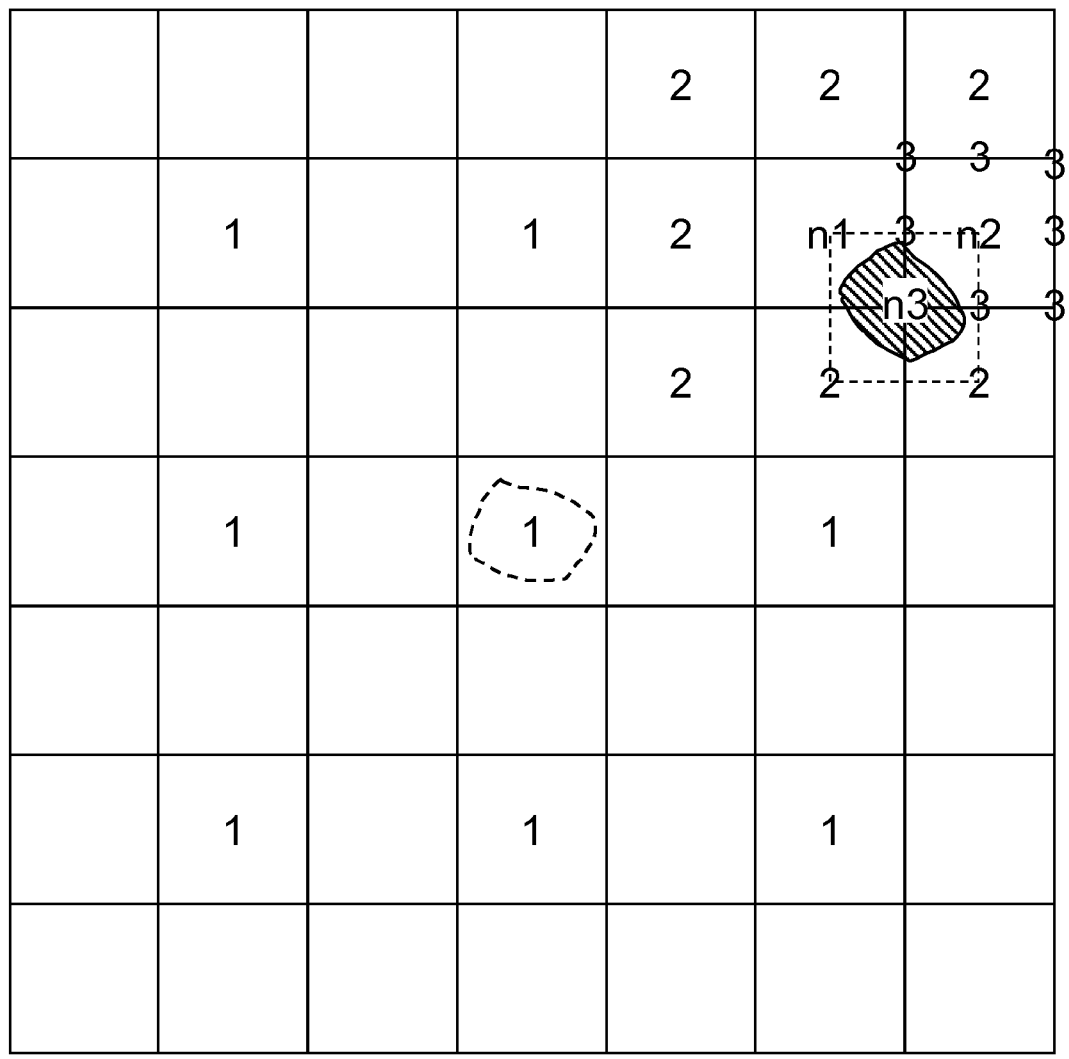
FIG. 12 is a schematic view of acquiring a moving object in the phased search procedure according to the present invention.

Referring to FIG. 12, in which when checking the local correlation part Corr(n), the data processing device 20 first searches the first blocks 1 to discover one first block n1 having a maximum similarity among the first blocks 1, and defines the similarity thereof as a first block correlation part Corr(n1).

$$\mathrm{Corr}(n1) = \max\{\mathrm{Sim}\langle \mathrm{Vec}^{t-1}(n), \mathrm{Vec}^{t}(1)\rangle\}$$

Next, the data processing device 20 searches the second blocks 2 surrounding the first block n1 having the first block correlation part Corr(n1) to discover one second block n2 having a maximum similarity among the second blocks 2, and defines the similarity thereof as a second block correlation part Corr(n2).

$$\mathrm{Corr}(n2) = \max\{\mathrm{Sim}\langle \mathrm{Vec}^{t-1}(n), \mathrm{Vec}^{t}(2) \rangle\}$$

The data processing device 20 compares the first block correlation part Corr(n1) with the second block correlation part Corr(n2), and if the first block correlation part Corr(n1) is greater than the second block correlation part Corr(n2), the first block correlation part Corr(n1) is taken as the local correlation part Corr(n), and the first block n1 having the first block correlation part Corr(n1) is taken as a position of the moving object 10 at a following time point t.

Conversely, if the second block correlation part Corr(n2) is greater than the first block correlation part Corr(n1), the data processing device 20 continues to search the third blocks 3 surrounding the second block n2 having the second block correlation part Corr(n2) to discover one third block n3 having a maximum similarity among the third blocks 3, and defines the similarity thereof as a third block correlation part Corr(n3).

$$\mathrm{Corr}(n3) = \max\{\mathrm{Sim}\langle \mathrm{Vec}^{t-1}(n), \mathrm{Vec}^{t}(3) \rangle\}$$

The data processing device 20 compares the second block correlation part Corr(n2) with the third block correlation part Corr(n3), and if the second block correlation part Corr(n2) is greater than the third block correlation part Corr(n3), the second block correlation part Corr(n2) is taken as the local correlation part Corr(n), and the second block n2 having the second block correlation part Corr(n2) is taken as a position of the moving object 10 at the following time point t.

On the contrary, if the third block correlation part Corr(n3) is greater than the second block correlation part Corr(n2), the data processing device 20 takes the third block correlation part Corr(n3) as the local correlation part Corr(n), and takes the third block n3 having the third block correlation part Corr(n3) as a position of the moving object 10 at the following time point t. The third block n3 having the third block correlation part Corr(n3) overlaps adjacent first block 1 and second blocks 2. Therefore, if a position of the moving object 10 is described with the third block n3, the situation that the moving object 10 equally occupies the adjacent first block 1 and second blocks 2 can be presented, and thus the position of the moving object 10 described with the third block n3 still can approximate an actual position of the moving object 10.

The present invention integrates an active part Active(n) produced by a moving object 10 with a local correlation part Corr(n) produced due to a position change of the moving object 10, so as to discover the moving object 10 in a successive images and mark a position thereof. In comparison with the prior art, the present invention does not need to remove the background, and simplifies the step of detecting the moving object 10 into two independent procedures, thereby rapidly marking a spatial position of the moving object 10 with fewer computing resources.

Furthermore, considering the form change of a gesture in the successive images and the color change caused by background light rays in actual situations of gesture manipulation, the successive images are divided into a plurality of blocks for description in the present invention, so as to tolerate the variations in the actual situations and achieve a higher computing speed.

While the present invention has been described by the way of example and in terms of the preferred embodiments, it is to be understood that the invention need not to be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A method for moving object detection, for detecting a moving object in a scene and marking a position of the moving object, the method comprising the following steps of:
    (a) obtaining successive images of the moving object and dividing the successive images into a plurality of blocks;
    (b) selecting one of the blocks and calculating a color feature value of the selected block at a current time point;
    (c) calculating a color feature value of the selected block at a following time point;
    (d) according to the color feature value at the current time point and the color feature value at the following time point in the block, obtaining an active part of the selected block;
    (e) comparing the color feature value of the selected block at the current time point with color feature values of the other blocks at the following time point one by one to respectively obtain a similarity relating to each of the other blocks, and defining a similarity having a maximum value as a local correlation part;
    (f) obtaining a motion-energy patch of the block according to the active part and the local correlation part of the selected block;
    (g) repeating Steps (b) to (f) to obtain motion-energy patches of all the blocks, so as to form a motion-energy map; and
    (h) acquiring a position of the moving object at the current time point according to the motion-energy map.

2. The method for moving object detection as claimed in 1, wherein the current time point and the following time point are time points when two frames are continuously generated.

3. The method for moving object detection as claimed in 1, wherein an interval of a plurality of frames exist between the frame obtained at the current time point and the frame obtained at the following time point.

4. The method for moving object detection as claimed in 1, wherein the color feature value is a color moment or color histogram of each block.

5. The method for moving object detection as claimed in 1, wherein the active part equals to a result obtained by dividing an absolute value of a difference between the color feature value at the current time point and the color feature value at the following time point by the color feature value at the current time point.

6. The method for moving object detection as claimed in 1, wherein the step of acquiring the moving object according to the motion-energy map comprises defining one or a plurality of blocks having motion-energy patches exceeding a threshold as the moving object.

7. The method for moving object detection as claimed in 1, wherein Step (e) further comprises:
    grouping the blocks into a plurality of first blocks and a plurality of second blocks, wherein two adjacent first blocks have at least one of the second blocks arranged there-between and each of the first blocks is surrounded by a part of the second blocks;
    defining a plurality of third blocks, wherein a size of each of the third blocks is the same as that of the first blocks and the second blocks, and a centroid of each of the third blocks is located at a midpoint or an endpoint of a side edge of the second block;

discovering a first block having a maximum similarity among the first blocks and defining the similarity thereof as a first block correlation part;

searching the second blocks surrounding the first block having the first block correlation part to discover one of the second blocks having a maximum similarity, and defining the similarity thereof as a second block correlation part;

comparing the first block correlation part with the second block correlation part; and defining the first block correlation part as the local correlation part when the first block correlation part is greater than the second block correlation part, and determining the first block having the first block correlation part as a position of the moving object at the following time point.

8. The method for moving object detection as claimed in 7, wherein when the second block correlation part is greater than the first block correlation part, the method further comprising the steps of:

searching the third blocks surrounding the second block having the second block correlation part to determine one of the third blocks having a maximum similarity and defining the similarity thereof as a third block correlation part;

comparing the second block correlation part with the third block correlation part; and defining the second block correlation part as the local correlation part when the second block correlation part is greater than the third block correlation part.

9. The method for moving object detection as claimed in 8, further comprising the step of defining the third block correlation part as the local correlation part when the third block correlation part is greater than the second block correlation part.

10. An hand gesture control method based on moving object detection, applicable to generate a motion track by detecting a position change of a moving object to input an input instruction corresponding to the motion track, the method comprising the following steps:

performing a method for moving object detection comprising the following steps:

(a) obtaining successive images of the moving object and dividing the successive images into a plurality of blocks;

(b) selecting one of the blocks and calculating a color feature value of the selected block at a current time point;

(c) calculating a color feature value of the selected block at a following time point;

(d) according to the color feature value at the current time point and the color feature value at the following time point in the block, obtaining an active part of the selected block;

(e) comparing the color feature value of the selected block at the current time point with color feature values of the other blocks at the following time point one by one to respectively obtain a similarity relating to each of the other blocks, and defining a similarity having a maximum value as a local correlation part;

(f) obtaining a motion-energy patch of the block according to the active part and the local correlation part of the selected block;

(g) repeating Steps (b) to (f) to obtain motion-energy patches of all the blocks, so as to form a motion-energy map; and (h) acquiring a position of the moving object at the current time point according to the motion-energy map.

recording the position in a register space;

generating a motion track according to a position change of the moving object;

determining whether the motion track matches a definition of instruction input; and outputting an input instruction corresponding to the motion track when the motion track matches a set definition of instruction input.

11. The hand gesture control method based on moving object detection as claimed in 10, wherein after obtaining the position of the moving object, the method further comprises steps of:

determining a state of a tracking tag; and when the tracking tag is negative, initializing the tracking tag to positive and clearing the register space.

12. The hand gesture control method based on moving object detection as claimed in 11, wherein the position is directly recorded in the register space, when the tracking tag is positive.

13. The hand gesture control method based on moving object detection as claimed in 11, wherein the tracking tag is marked as negative, when the motion track matches the set definition of instruction input.

14. The hand gesture control method based on moving object detection as claimed in 11, wherein a position of the moving object is acquired once again, when the motion track does not match the definition of instruction input.

* * * * *